Patented Sept. 21, 1937

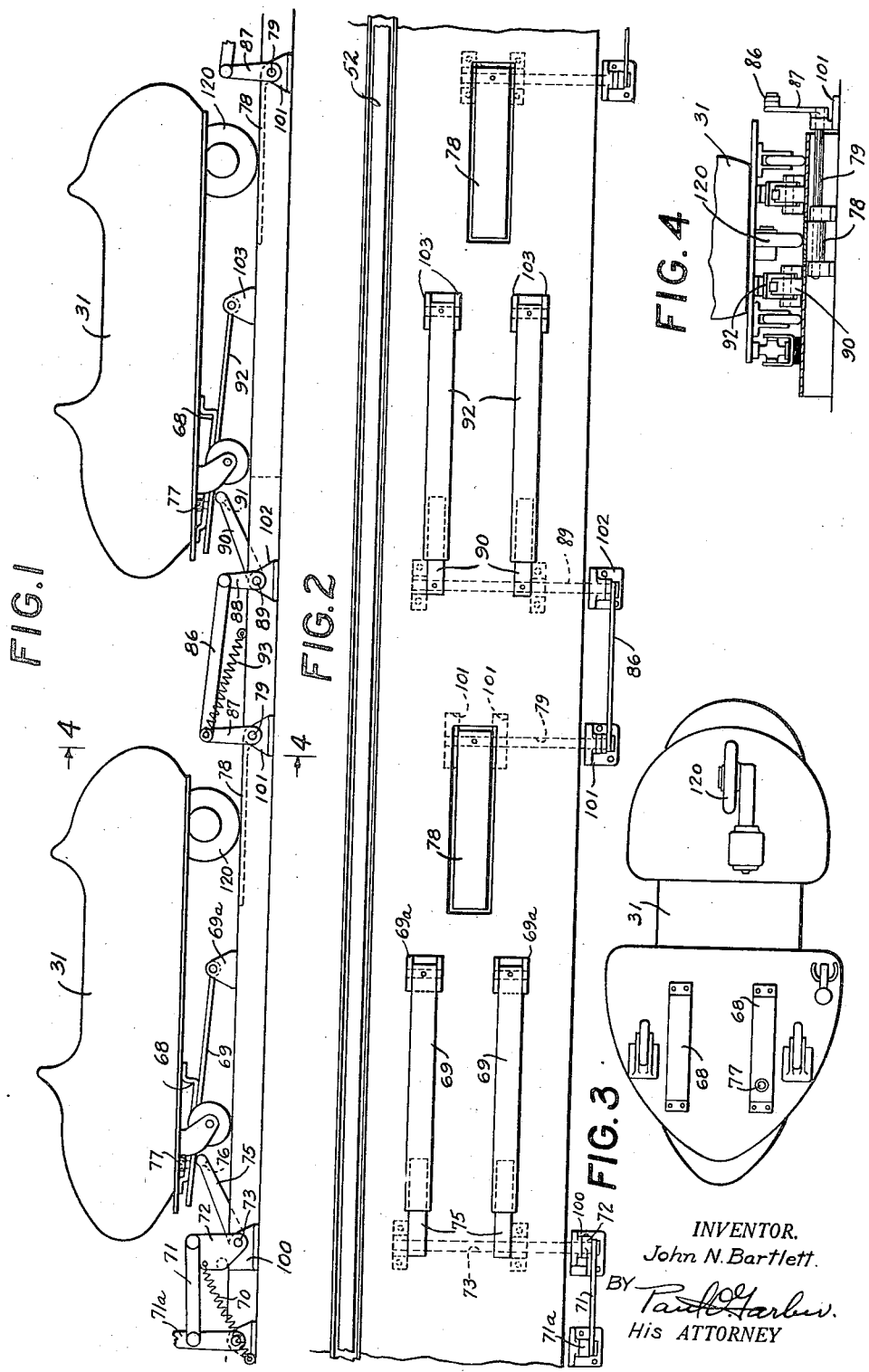

2,093,795

UNITED STATES PATENT OFFICE 2,093,795

AMUSEMENT DEVICE

John N. Bartlett, Tonawanda, N. Y.

Original application July 6, 1932, Serial No. 621,037. Divided and this application October 30, 1934, Serial No. 750,733

8 Claims. (Cl. 104—84)

This invention relates to improvements in amusement devices, and more particularly relates to automatic devices for controlling passenger carrying vehicles.

The subject-matter of this application forms a division of my copending application Serial No. 621,037, filed July 6, 1932.

The invention has for its main object the provision of novel means to automatically stop vehicles in predetermined positions.

Another object is to provide novel automatic brakes whereby a car, automatically stopped at a loading platform, adjusts a braking device to automatically stop the next following car and said following car automatically sets brakes to stop the third car, etc.

With these and other incidental objects in view, the invention consists of certain novel features of construction and combination of parts, the essential elements of which are set forth in the appended claims and a preferred form or embodiment of which is hereinafter described with reference to the drawing which accompanies and forms a part of the specification.

In said drawing:

Fig. 1 is a view in side elevation showing the automatic brakes.

Fig. 2 is a plan view of the brakes.

Fig. 3 is a bottom view of one of the cars.

Fig. 4 is an end view of the car and brakes.

Automatic brakes

The herein disclosed system of automatic brakes is employed to stop a plurality of cars at a loading and unloading platform. The leading car is stopped by a brake normally held in effective position by a spring, and which is adapted to be released manually by an operator. As the leading car is stopped it automatically sets brakes to stop the next car following, and this latter car sets brakes to stop the car following it, etc.

Each car 31 is provided with a pair of brake shoes 68 (Figs. 1 and 3) secured to the bottom thereof. These brake shoes are adapted to co-operate with a pair of brake bars 69 pivotally mounted in brackets 69a supported on the floor of the track area, and properly spaced from the main guide rail 52 and from each other. The brake bars 69 for the leading brake normally are held in their raised or effective positions by a spring 70 having one of its ends secured to an operating rod 71, one end of which rod is connected to a brake release lever 71a. The other end of rod 71 is pivotally connected to an arm 72 fast on a shaft 73, pivotally mounted in brackets 100 secured on the floor of the track. Arms 75 secured on the shaft 73 carry rollers 76 which rollers normally hold the bars 69 in their elevated positions under the influence of the spring 70.

As the brake shoes 68 on an approaching car come into contact with the normally raised brake bars 69 the braking action brings the car to a stop and at the same time a switch 77 carried on one of the shoes 68 is automatically operated to open an electrical circuit to the motor, provided to drive each car, thus deenergizing the motor and completing the stopping action.

After the car is loaded the operator starts it by operating the lever 71a which thrusts the rod 71 toward the right (Fig. 1) against the tension of the spring 70 rocking the arm 72, shaft 73 and arms 75 clockwise, whereupon the brake bars 69 assume their ineffective positions and the spring operated switch 77 closes the electrical circuit permitting current to flow through the drive motor. The car immediately moves away from the loading platform.

When a car moves up to the loading platform and is stopped by the brakes, it automatically sets brake bars to stop the next car approaching from the rear. This is accomplished by the single drive wheel 120 at the rear of the car. The drive wheel, as the car comes to a stop, rides onto a normally raised treadle 78 secured to a shaft 79 mounted in brackets 101 secured to the floor of the trackway. When the treadle 78 is operated, rocking the shaft 79 counter-clockwise, it draws a rod 86 connecting an arm 87 on the shaft 79 and an arm 88 on a shaft 89 mounted in brackets 102, toward the left. This rocks the shaft 89 also counter-clockwise, which shaft, through a pair of arms 90 carrying rollers 91 on their ends, raises a pair of brake bars 92 pivotally supported in brackets 103 mounted on the track floor, to their effective positions.

If a car approaches the loading platform while the first car is still there, the brake shoes 68 thereon, coming into contact with the brake bars 92, arrests the forward movement of said car and operates the switch 77 on the particular car to open the electrical circuit to the drive motor. This second car likewise sets a similar brake mechanism to stop another car which may be following, etc.

It may be noted that the shafts 73, 79, and 89 are mounted below the level of the track, and by reference to Fig. 2 it may be seen that the arms 87 and 88, as well as the connecting bar 86, are mounted to one side of the trackway a sufficient distance to avoid interference with the cars.

This also applies to the brake release lever 71a, the rod 71, and the arm 72. The brake bars 69 and 92 are so spaced that the front wheels of the cars pass to the outer sides of them and the drive wheel 120 passes between said brake bars.

When the operator releases the brake bars 69 and the leading car moves away from the platform the spring 70 immediately raises the brake bars 69 to effective position and the drive wheel 120 of said car rides off of the treadle 78, whereupon a spring 93 rotates the arms 87 and the shaft 79 clockwise to raise the treadle 78. The spring 93 at the same time thrusts the rod 86 toward the right rocking the arm 88 and the shaft 89 clockwise to release the brake bars 92. The car now starts forward, but as it arrives at the position of the car which just departed, the brake shoes 78 come into contact with the brake bars 69, which were raised by the spring 70, and is brought to a stop. Obviously the only duty incumbent upon the attendant in order to control the departure of the cars is to operate the brake release lever 71a to release the brakes for the leading car, and to release the lever as soon as the car has started. The remainder of the mechanism for stopping and starting the cars operates automatically. It is also obvious that this brake system may be extended to handle any convenient number of cars.

While the forms of mechanism herein shown and described are admirably adapted to fulfill the objects primarily stated it is to be understood that it is not intended to confine the invention to the one form or embodiment herein disclosed, for it is susceptible of embodiment in various forms all coming within the scope of the claims which follow.

What is claimed is:

1. In an amusement ride of the class described, the combination of a plurality of cars adapted to be individually propelled along a track, a normally effective brake on the track to arrest one of the cars, and means operated by the arrested car as said car comes to rest to arrest the next following car.

2. In an amusement ride of the class described, the combination of a plurality of cars adapted to be individually propelled, a normally effective brake on the track to arrest one of the cars, means operated by the arrested car as said car comes to rest to arrest the next following car, and manually operated means to render the brake ineffective.

3. In an amusement ride of the class described, the combination with a plurality of individually propelled cars each being provided with a brake shoe, of a brake bar on a trackway said brake bar being in normally effective position to co-operate with the brake shoe to arrest one of the cars, and a second brake bar operated by the arrested car as said car comes to rest to arrest the next following car.

4. In an amusement ride of the class described, the combination with a plurality of cars adapted to be individually propelled along a trackway, each car being provided with a brake shoe, of a normally effective brake bar on the track to co-operate with the brake shoe to arrest one of the cars, a second pivoted brake bar operated by the arrested car as said car comes to rest to arrest the next following car, and manually operated means to operate the first mentioned brake bar to free the first arrested car.

5. In an amusement ride of the class described, the combination with a plurality of cars adapted to be individually propelled along a trackway, each car being provided with a brake shoe, of a normally effective brake bar on the track to co-operate with the brake shoe to arrest one of the cars, a normally ineffective brake bar on the track, and means operated by the arrested car to render the normally ineffective brake bar effective to arrest the next following car.

6. In an amusement ride of the class described, the combination with a plurality of cars adapted to be individually propelled along a trackway each car being provided with a brake shoe, of a normally effective brake bar on the track to co-operate with the brake shoe to arrest one of the cars, a normally ineffective brake bar on the track, means operated by the arrested car to render the ineffective brake bar effective to arrest the next following car, manually operated means to render the normally effective brake bar ineffective, and automatic means to restore the normally ineffective brake bar to its ineffective position.

7. In an amusement ride of the class described, the combination with a plurality of cars adapted to be individually propelled along a trackway each car being provided with a brake shoe and a power switch, of a normally effective brake bar on the track to co-operate with the brake shoe and the switch to simultaneously open said switch and arrest one of the cars, and a second brake bar on the track operated by the arrested car as said car comes to rest to simultaneously open the switch on the next following car and arrest said next following car.

8. In an amusement ride of the class described, the combination with a plurality of cars adapted to be individually propelled along a trackway each car being provided with a brake shoe and a power switch, of a normally effective brake bar on the track to co-operate with the brake shoe and the switch to simultaneously open said switch and arrest one of the cars, a normally ineffective brake bar on the track, means operated by the arrested car to render the normally ineffective brake bar effective to simultaneously open the switch on the next following car and to arrest said next following car, and manually operated means to render the first mentioned brake bar ineffective to free the first arrested car.

JOHN N. BARTLETT.